Figure 1:
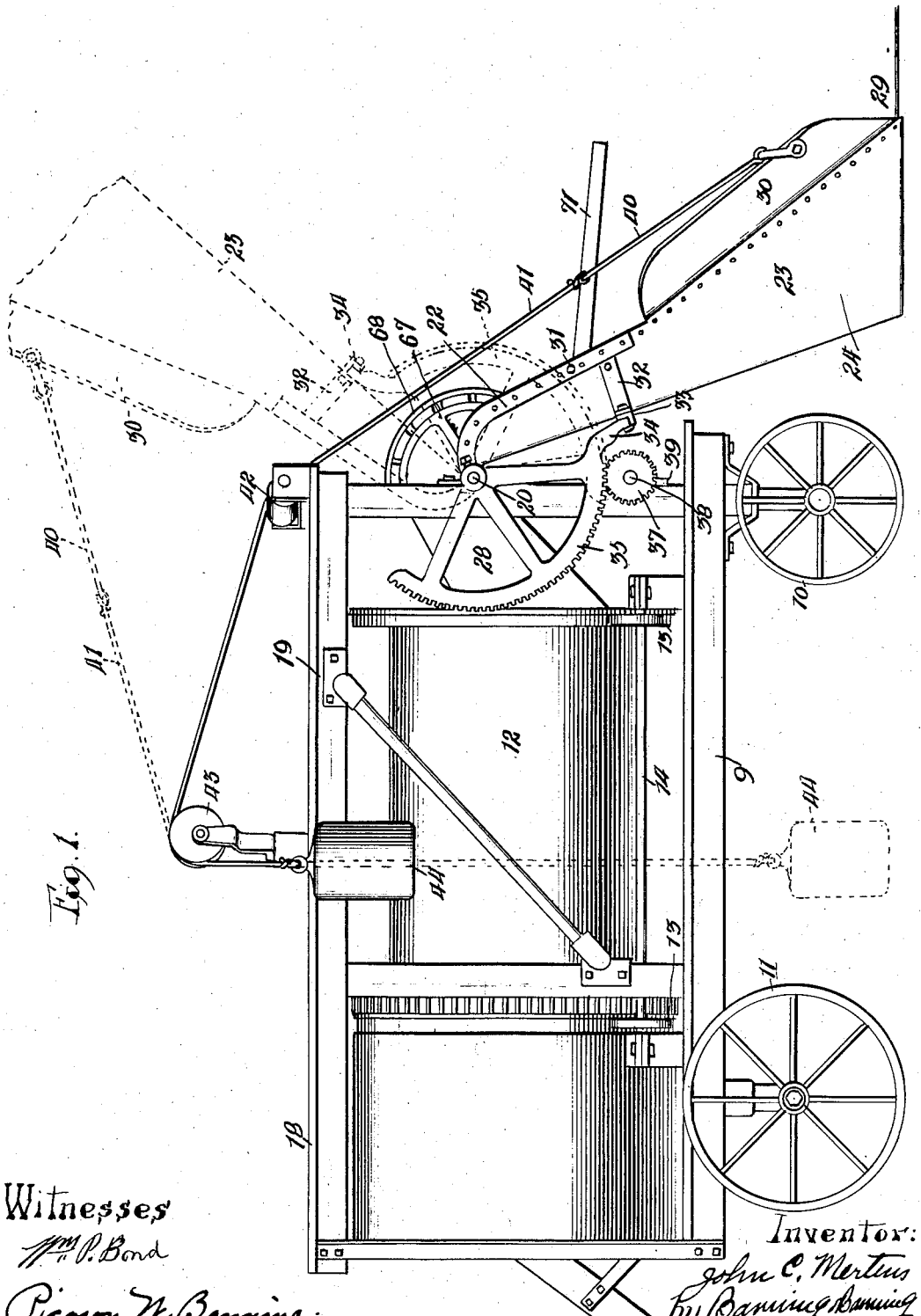

No. 889,706. PATENTED JUNE 2, 1908.
J. C. MERTENS.
HOPPER MECHANISM.
APPLICATION FILED JULY 6, 1907.

3 SHEETS—SHEET 1.

Witnesses
Wm. P. Bond
Pierson W. Banning

Inventor:
John C. Mertens
by Banning & Banning
Attys

No. 889,706. PATENTED JUNE 2, 1908.
J. C. MERTENS.
HOPPER MECHANISM.
APPLICATION FILED JULY 6, 1907.
3 SHEETS—SHEET 2.
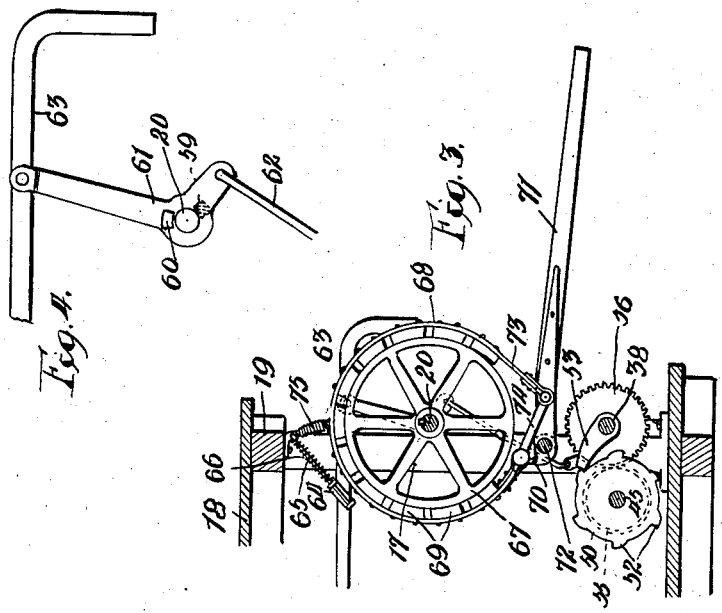
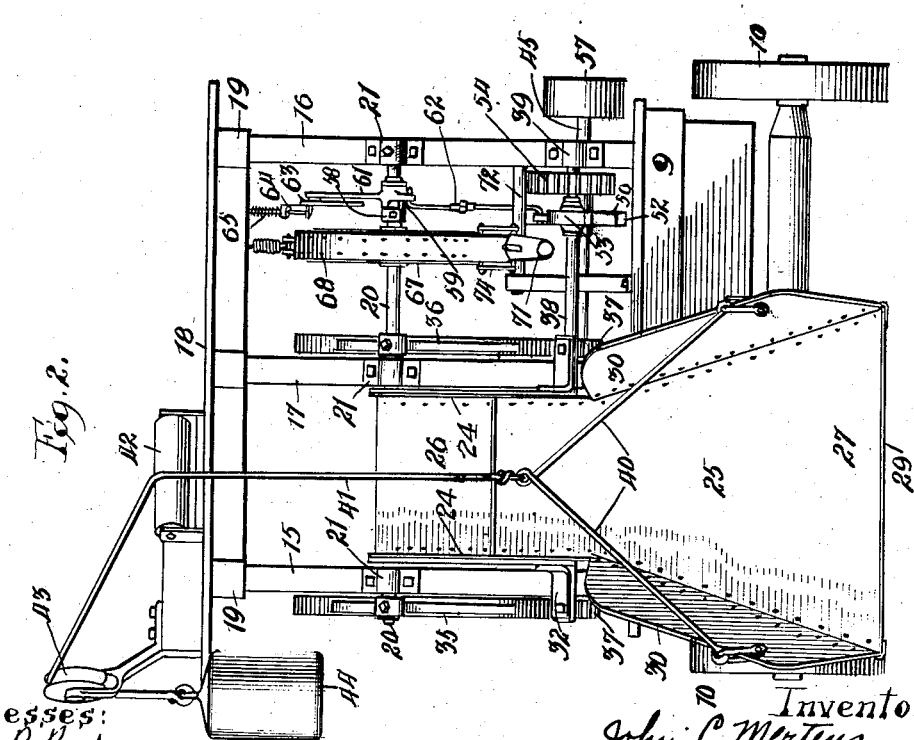
Witnesses:
Wm P. Bond
Pirson W. Banning.
Inventor:
John C. Mertens
by Banning & Banning
Attys No. 889,706. PATENTED JUNE 2, 1908.
J. C. MERTENS.
HOPPER MECHANISM.
APPLICATION FILED JULY 6, 1907.
3 SHEETS—SHEET 3.
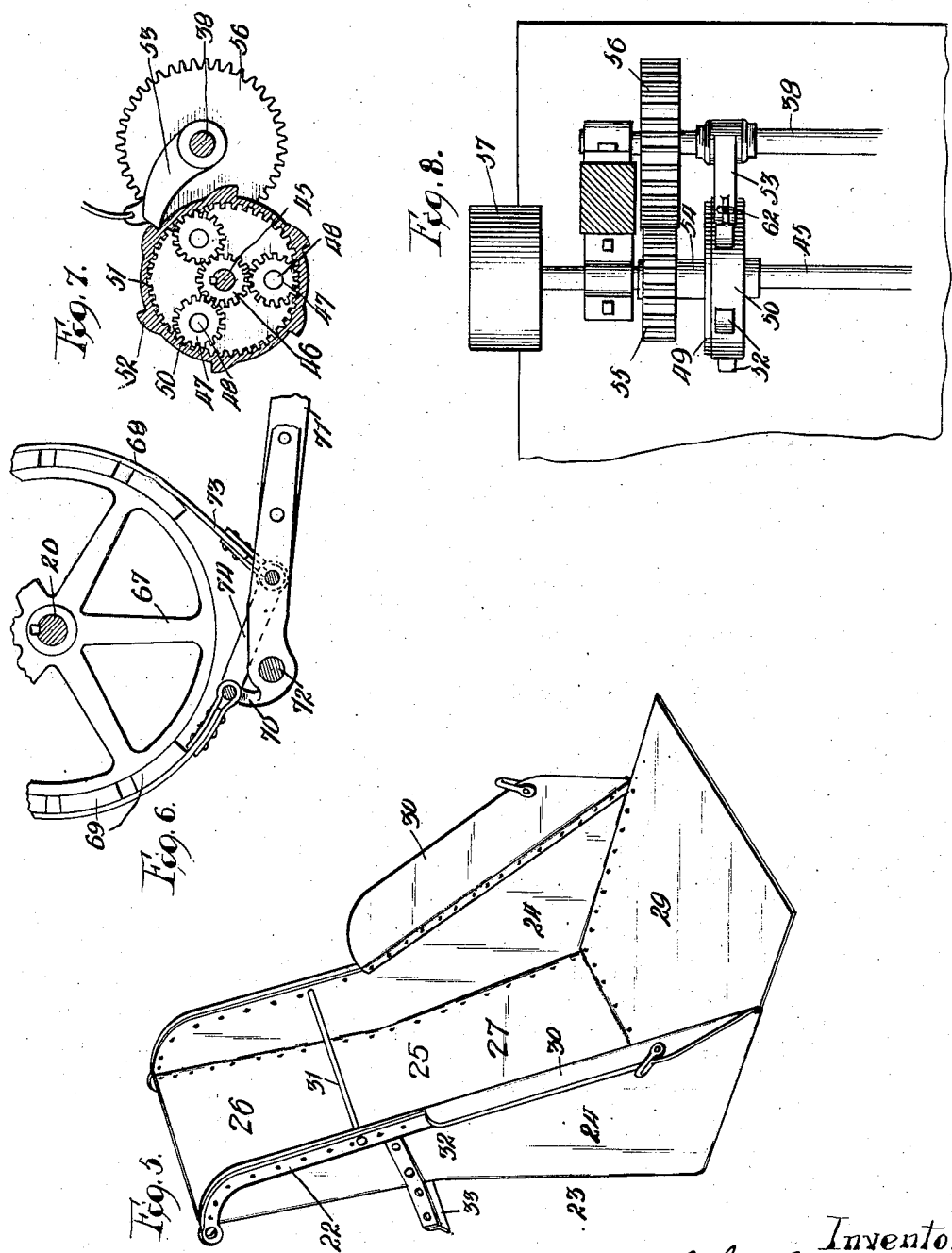

UNITED STATES PATENT OFFICE.

JOHN C. MERTENS, OF CHICAGO, ILLINOIS, ASSIGNOR OF ONE-HALF TO JOSEPH HANREDDY, OF CHICAGO, ILLINOIS.

HOPPER MECHANISM.

No. 889,706.        Specification of Letters Patent.        Patented June 2, 1908.

Application filed July 6, 1907. Serial No. 382,441.

*To all whom it may concern:*

Be it known that I, JOHN C. MERTENS, a citizen of the United States, residing at Chicago, in the county of Cook and State of Illinois, have invented certain new and useful Improvements in Hopper Mechanism, of which the following is a specification.

This invention more particularly relates to certain improvements in hopper mechanism for use in connection with concrete mixers.

The object of the invention is to so construct the hopper that it will lie flat upon the ground and in a position to receive a wheelbarrow load of material dumped thereinto from the ground level, thereby obviating the necessity for providing skids or runways for elevating the load prior to its discharge into the hopper. This greatly facilitates the mixing operation and relieves the workmen from the trouble and work of running a wheelbarrow up a skid or runway, and likewise obviates the necessity for providing such structures, which is a matter of importance, in view of the fact that the position of the mixer must, of necessity, be frequently changed, so that it is highly desirable that the hopper mechanism be of a form and style that can be used without the necessity for providing additional or extraneous structures.

The invention further relates to brake mechanism for regulating the return of the hopper to normal position after its discharge, whereby the hopper can be maintained in elevated position for a sufficient length of time to allow the load carried thereby to be fully discharged, and can thereafter be lowered at any suitable speed instead of being violently dropped to the ground, as has been previously the case in devices of this kind, which violent dropping of the hopper resulted in an imperfect discharge of the material, in danger to the workmen, and in damage to the mechanism.

The present invention is adapted to be automatically raised and released and at the same time the device will be under the perfect control of the operator at all times, which is a much more satisfactory mode of operating the mixer than by the use of purely automatic mechanism.

The invention consists in the features of construction and combination of parts hereinafter described and claimed.

In the drawings, Figure 1 is a side elevation of the entire mixer, showing, in full lines, the hopper in its lowered position, and showing, in dotted lines, the hopper in its raised position; Fig. 2 a front end elevation of the same; Fig. 3 a detail showing the brake mechanism for regulating the descent of the hopper; Fig. 4 a detail, showing the dog actuating trip mechanism; Fig. 5 a perspective view of the hopper; Fig. 6 an enlarged detail of the brake mechanism; Fig. 7 a sectional elevation, showing the planetary gear clutch; and Fig. 8 a top or plan view of the shaft and clutch mechanism.

The mixer, to which the hopper actuating mechanism of the present invention is applied, is of an old type and its interior construction need not be fully described. It consists essentially of a platform 9, mounted upon pivoted front wheels 10 and rear wheels 11, which adapts the mechanism to be readily moved from place to place. The platform serves as a mounting for a revoluble drum 12, mounted upon rollers 13, which latter are carried by a shaft 14. The construction of the frame and the method of revolving the same, however, form no part of the present invention, and other methods of positioning and mounting the drum may be employed.

The platform, at its front end, has outer upright posts 15 and 16 and an intermediate upright post 17, which posts serve to support an upper platform 18, which is carried by longitudinally extending sills 19. The uprights 15, 16 and 17 serve to support a hopper shaft 20, which is mounted within journal bearings 21 on the respective uprights, substantially half way between the lower and upper platforms. Intermediate the uprights 15 and 17 are a pair of outwardly curved hopper arms 22, rigidly secured to and movable with the hopper shaft, to which arms a hopper 23 is secured. The hopper comprises side walls 24, which enlarge toward their outer ends and which, when lowered, are of sufficient length to reach to and lie flat upon the ground, as shown in Fig. 1. The side walls are connected by a rear wall 25, the upper end 26 of which is of uniform width, and the lower end 27 of which is of uniformly increasing width toward its receiving end, the side walls 24 being bent to conform to the formation of the rear wall. This gives to the hopper a chute formation at its discharge end, the extremity of which is in close proximity to a fixed chute 28 projecting from the forward end of the revolving drum. The hopper likewise comprises a floor 29, the forward end of which projects outwardly beyond the side walls and is adapted, when the hopper is lowered, to have a wheelbarrow wheeled thereon for discharging its load. The side walls 24 are provided, along their lower outer edges, with flaring guide plates 30, which are riveted or otherwise secured to the side wall and serve to divert the material striking thereon into the body of the hopper. The formation of the hopper is best indicated in Fig. 5, from which it appears that the hopper is continuous from the ground up to the level of the hopper shaft, being of enlarged formation at its receiving end and contracted formation at its discharging end The hopper arms are connected and the hopper reinforced by means of a brace rod 31, which extends across the discharge portion of the hopper a considerable distance in front of the rear wall thereof, leaving the hopper unobstructed beneath the rod for the discharge of material.

The side walls of the hopper, in close proximity to the brace rod, are provided, on their outer faces, with angle plates 32, the projecting ends of which are riveted to an angle bar 33, which extends across behind the rear wall of the hopper and serves to further reinforce the hopper and also provide an attachment for two fingers 34, which forwardly project from a pair of segmental racks 35 and 36, which are secured to the hopper shaft, the former of which is keyed to the hopper shaft outside of the upright 15, and the latter of which is likewise keyed to the hopper shaft immediately beyond the upright 17. The segmental racks 35 and 36 are in mesh with a pair of pinions 37, which are mounted on a power transmission shaft 38, which, like the hopper shaft, is mounted within journal boxes 39 on the uprights. The hopper is provided with a yoke 40, the divergent arms of which are secured, at their free ends, to the flaring guide plates 30, and the yoke has connected therewith and upwardly extending therefrom a cable 41, which passes over a roller 42 on the upper platform 18, and a sheave 43 similarly positioned, and terminates in a counterweight 44, which serves to facilitate the raising and lowering of the hopper.

Immediately behind the power transmission shaft 38 is a power shaft 45, to which is keyed a pinion 46 meshing with planetary gears 47, each mounted upon a stub shaft 48, which shafts are carried by a plate 49, loosely mounted upon the power shaft 45. The plate 49 coöperates with a ratchet ring 50, provided with interior gear teeth 51 and provided on its periphery, at suitable intervals, with ratchet lugs 52, which are adapted to be engaged by a dog 53, pivoted on the power transmission shaft 38. The plate 49 is provided with a hub 54, to which is rigidly secured a gear wheel 55, which, like the plate, is loosely journaled on the power shaft 45, and the gear wheel 55 meshes with a gear wheel 56, which is keyed or otherwise rigidly secured to the power transmission shaft 38. The power shaft is provided with a belt pulley 57, which is adapted to impart a constant rotation to the power shaft 45.

The hopper shaft 20 is provided, near the upright 16, with a collar 58, provided at a suitable point with a lug 59, which lug coöperates with a lug 60 on a bell crank arm 61, which is pivoted on the hopper shaft 20; and the lower arm of the bell crank lever is connected, by means of a link 62, with the dog 53, which is immediately beneath the bell crank lever. The upper arm of the bell crank lever is connected with an operating arm 63, provided with a flanged bracket 64, which is slidable upon a rod 65 and is adapted to compress a spring 66 or other suitable mechanism for exerting an inward tension on the arm when pulled forward out of normal position.

Adjacent to the collar 58, upon the hopper shaft 20, is keyed a brake wheel 67, which is surrounded by a band brake 68, provided with a plurality of shoe blocks 69 adapted to be brought into frictional engagement with the periphery of the wheel. The inner end of the band brake is connected to an upturned finger 70 on the inner end of an operating lever 71, which is pivoted to a rod 72 located above and in parallel relation with the power transmission shaft 38, and the other end 73 of the band brake is connected directly with the lever 71 at a point forward of its fulcrum. The two ends of the band brakes are connected with each other by means of a link 74, which serves to reinforce the upturned finger 72 and strengthen the lever at the point of greatest tension. A spring 75 is connected with the upper portion of the band brake and is adapted to loosen up the brake when the tension on the lever is relieved.

In use, with the hopper in its lowermost position, as shown in Figs. 1 and 2, the operating arm 63 will be retracted by the action of the spring 66, which serves to throw back the upper arm of the bell crank lever, thereby raising the lower arm and with it the dog 53, which raising of the dog releases the ratchet ring 50 and permits it to run free around the planetary gear wheels, which will be revolved by the action of the center gear wheel 46, which is keyed onto the constantly running power shaft 45. This freedom of movement of the planetary gears around the center gear wheel as an axis unclutches the device and prevents the transmission of power from the power shaft to the power transmission shaft, so that the hopper will remain in lowered position so long as the adjustment above described is maintained. When the operating arm 63 is drawn forward against the tension of the spring 66, the dog 53 will be depressed and thrown into engagement with one of the ratchet lugs of the ratchet ring 50. This serves to lock the ring against revolution, and thereafter the revolving of the center gear wheel 46 will cause the planetary gears to travel around the gear wheel 46 as a bearing, and this action of the planetary gear wheels rotates the plate 49, to which they are attached, and with it the gear wheel 55, which imparts rotation to the gear wheel 56 and the shaft 38 upon which the pinions 37 are mounted. The rotation of the pinions 37 actuates the segmental racks, which are rigidly secured to the hopper shaft, so that the hopper will be swung through the arc of a circle out of its lowered position into the position shown in dotted lines in Fig. 1, and this upward movement will be facilitated by the counterweight. When the hopper has reached its uppermost position, the back or cross wall will be tilted, allowing the material to slide down through the contracted inner end or chute like portion of the hopper, and thence into the stationary chute 28 and into the revolving drum. This movement of the hopper shaft carries with the collar 58 having thereon the lug 59, which will be moved through the arc of a circle until it engages the companion lug 60 on the bell crank. When the two lugs have thus been brought into engagement, the bell crank will be carried around until the lower arm thereof has been sufficiently raised to release the dog 53 from engagement with the ratchet ring, thereby releasing the planetary clutch mechanism and allowing the empty hopper to descend by gravity.

The above described operating mechanism is of a well known description, but in use it has been found that the automatic releasing of the planetary clutch and the sudden descent of the hopper frequently resulted in imperfect discharge of the material from the hopper and in accidents to workmen and also in violent falling of the hopper, which tended to rack the machine and impair its operation. To avoid these disastrous consequences, the brake mechanism heretofore described has been invented, which permits the operator, after initially pulling forward the starting arm or lever 63, to fix his attention upon the hopper, and when the latter has reached its discharging position, to depress the brake lever and clamp the band brake on the brake wheel, which enables the operator to control the descent of the hopper after the automatic trip mechanism has released the clutch, so that a perfect discharge of material can be secured and accidents prevented and the descent of the empty hopper regulated. The brake mechanism is located at a point of easy access to the operator of the machine, who is enabled to control the starting lever and brake lever from the same position, which is a position which enables him to observe the discharge of the load and time the descent of the hopper accordingly. The formation of the hopper is one which permits the material to be easily dumped thereinto and relieves the workmen from the strain of lifting the material above the ground level, the entire lifting operation from the ground to the point of discharge being performed by power, which is a much more rapid and satisfactory method of operating the device than that prevailing in concrete mixers of the usual type.

What I regard as new and desire to secure by Letters Patent is—

1. In mechanism of the general class described, the combination of a hopper having its discharge opening above the ground level, mechanism for raising the hopper, means for automatically unclutching such mechanism, and a hand actuated brake for regulating the return movement of the hopper, substantially as described.

2. In mechanism of the general class described, the combination of a hopper shaft, a hopper rigidly secured to the hopper shaft, a power shaft, a clutch mechanism for regulating the transmission of power from the power shaft to the hopper shaft, automatic trip mechanism on the hopper shaft for releasing the clutch mechanism when the hopper has reached its uppermost position, and a hand actuated brake mechanism for regulating the return movement of the hopper, substantially as described.

3. In mechanism of the general class described, the combination of a hopper shaft, a hopper rigidly secured to the hopper shaft, a power shaft, a clutch mechanism for regulating the transmission of power from the power shaft to the hopper shaft, automatic trip mechanism on the hopper shaft for releasing the clutch mechanism when the hopper has reached its uppermost position, a brake wheel on the hopper shaft, a band brake surrounding the brake wheel, and a brake lever for actuating the hand actuated brake for regulating the return movement of the lever, substantially as described.

4. In mechanism of the general class described, the combination of a hopper shaft, a hopper rigidly secured to the shaft and comprising a rear cross wall, side walls and a bottom, the latter being flush with the ground when the hopper is lowered, a power shaft, a clutch mechanism adapted to regulate the transmission from the power shaft to the hopper shaft, releasing mechanism on the hopper shaft adapted to automatically release the clutch when the hopper has reached its highest position, and a hand actuated brake for regulating the return movement of the hopper, substantially as described.

5. In mechanism of the general class described, the combination of a hopper shaft, a hopper rigidly secured to the shaft and comprising a rear cross wall, side walls and a bottom, the latter being flush with the ground when the hopper is lowered, a power shaft, a clutch mechanism adapted to regulate the transmission from the power shaft to the hopper shaft, releasing mechanism on the hopper shaft adapted to automatically release the clutch when the hopper has reached its highest position, a brake for regulating the return movement of the hopper, and a brake wheel on the hopper shaft, a band brake surrounding the brake wheel, a lever for actuating the band brake for regulating the return movement of the hopper, substantially as described.

JOHN C. MERTENS.

Witnesses:
SAMUEL W. BANNING,
WALKER BANNING.